Aug. 2, 1966   E. W. YETTER   3,264,612
SEQUENCE CONTROLLER

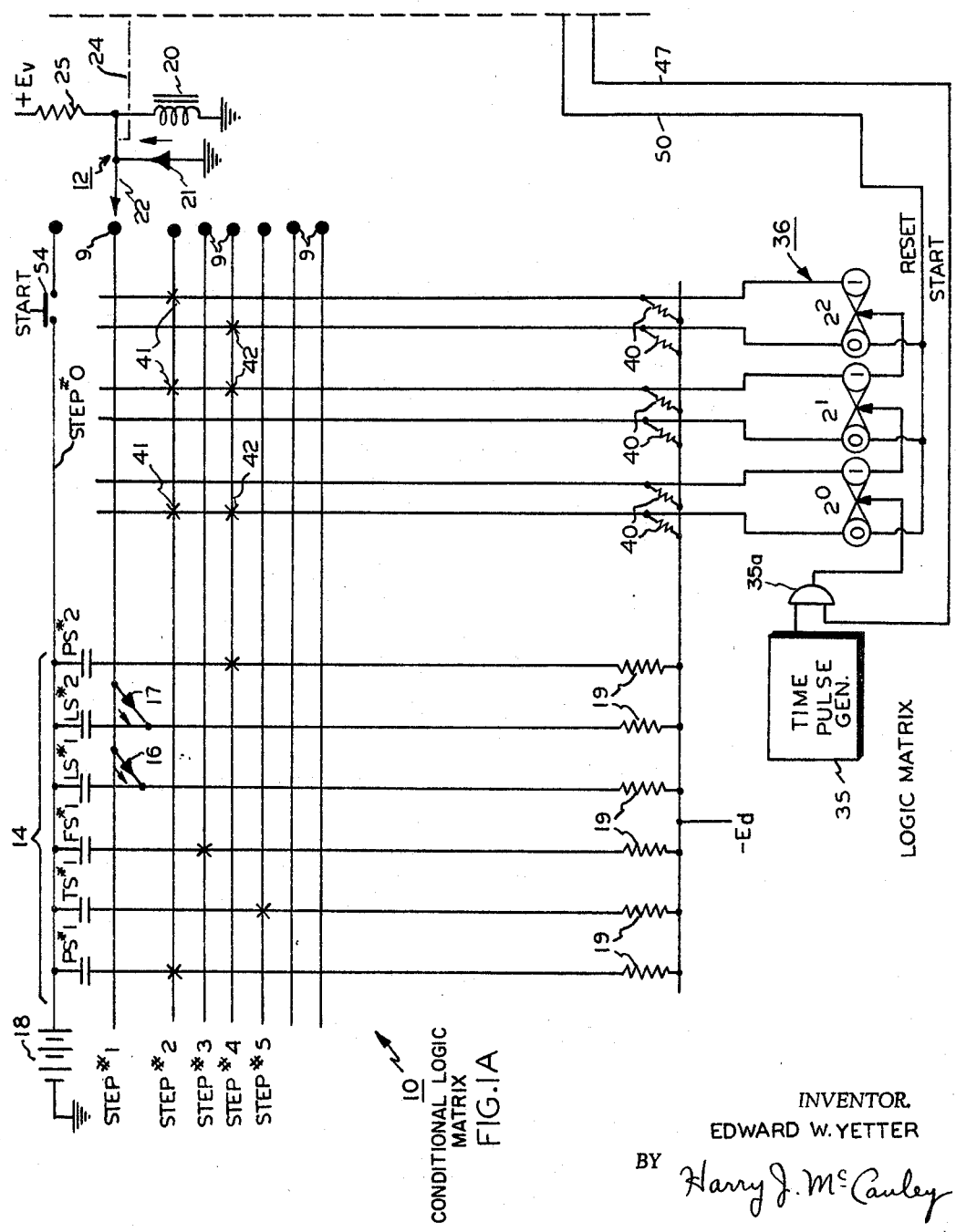

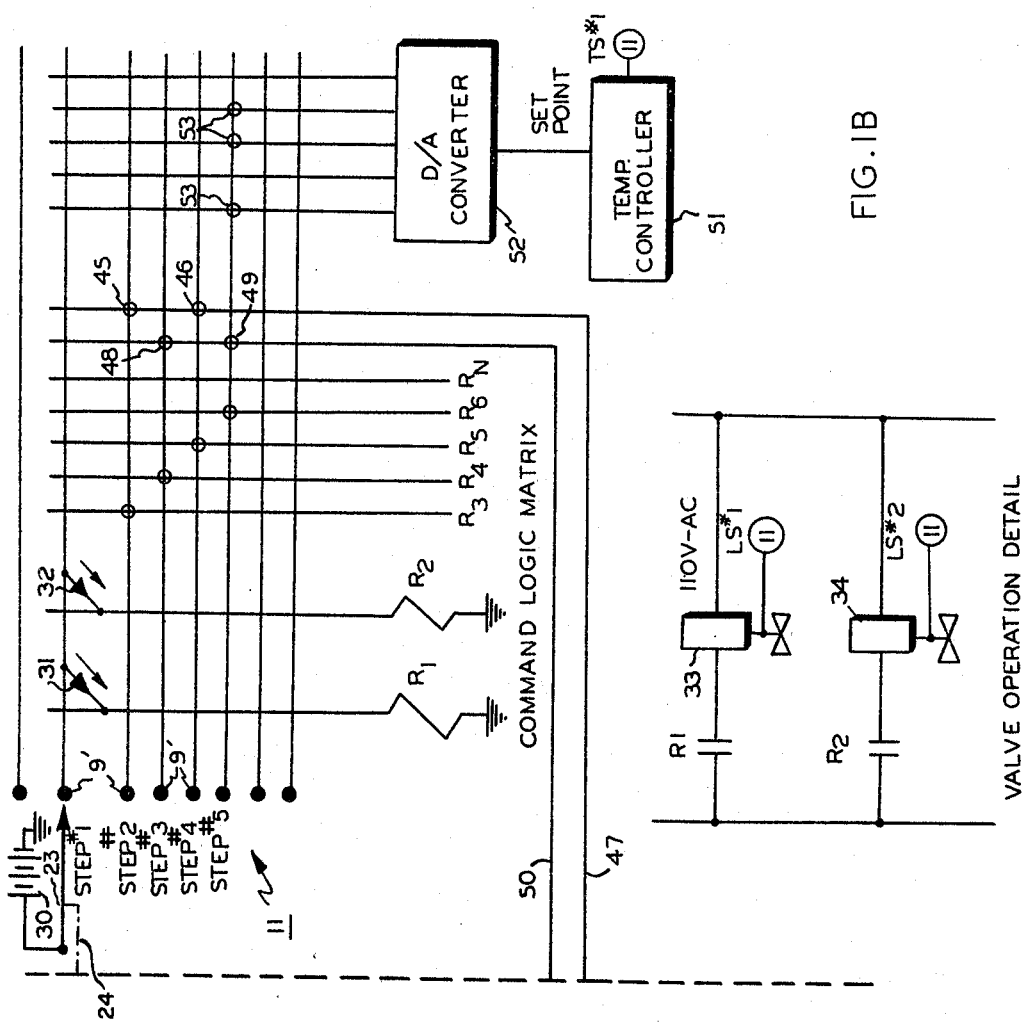

Filed Aug. 21, 1961   4 Sheets-Sheet 4

INVENTOR.
EDWARD W. YETTER
BY Harry J. McCauley
ATTORNEY

United States Patent Office 3,264,612
Patented August 2, 1966

3,264,612
SEQUENCE CONTROLLER
Edward W. Yetter, West Chester, Pa., assignor to E. I. du Pont de Nemours and Company, Wilmington, Del., a corporation of Delaware
Filed Aug. 21, 1961, Ser. No. 132,661
4 Claims. (Cl. 340—147)

This invention relates to a sequence controller, and particularly to an electrical sequence controller adapted to carry out batch-type chemical processes or similar operations.

Automatic control of manufacturing processes has hitherto been largely restricted to a preselected time apportionment for the performance of given operations in sequence, although, recently, advances in computer technology have permitted the basing of control on the attainment of given process conditions or product characteristics. The sequence controller of this invention is of the latter general type, but is an improvement, in that it utilizes relatively inexpensive components in a combination which affords very great flexibility in the utilization of all types of control signals, including transducer-generated, manual, time-count and others. A different but somewhat related design of programmed batch sequence controller is taught in my copending U.S. application S.N. 132,656, filed the same date herewith.

Figure 2:
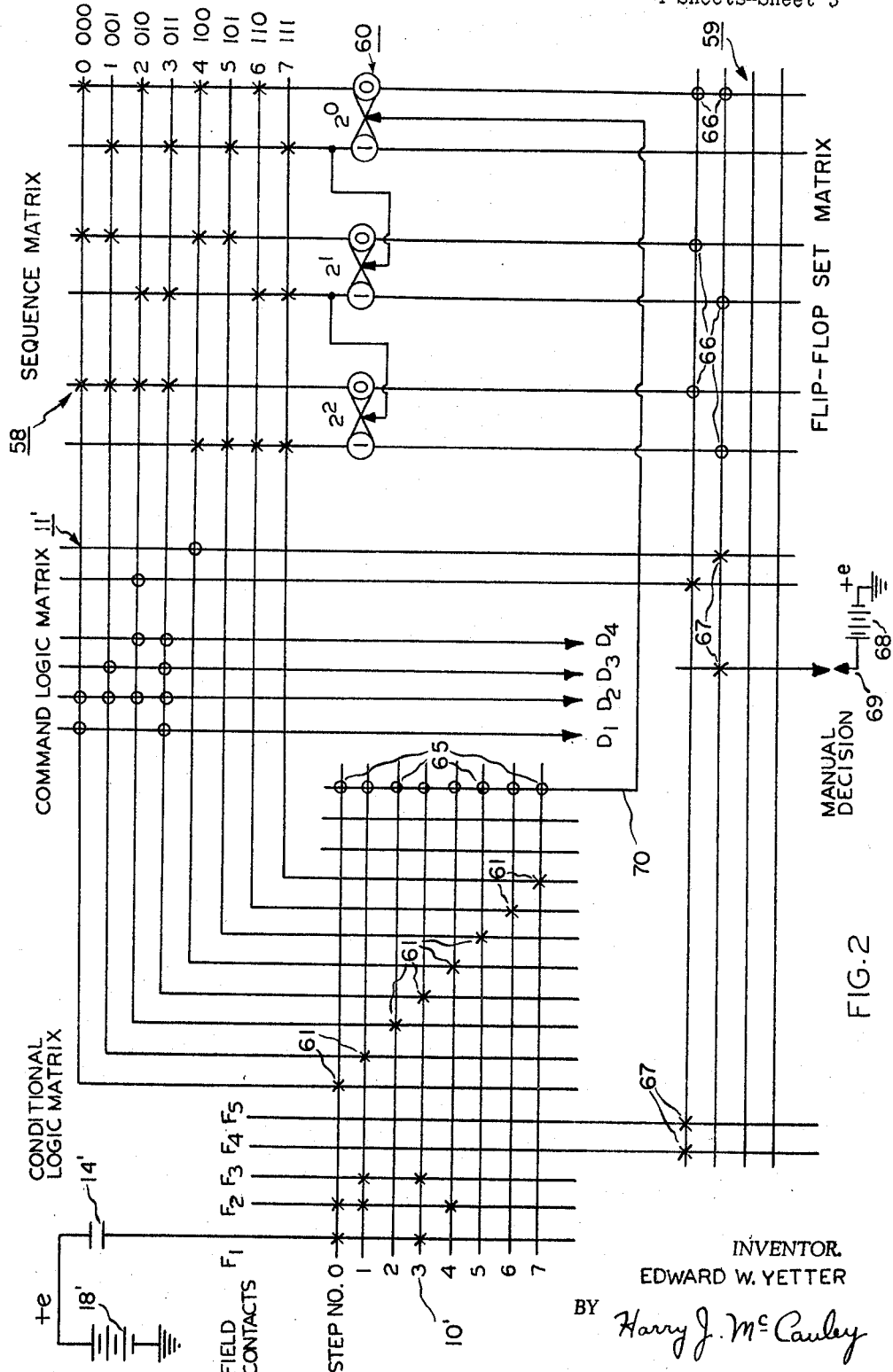
Figure 3:
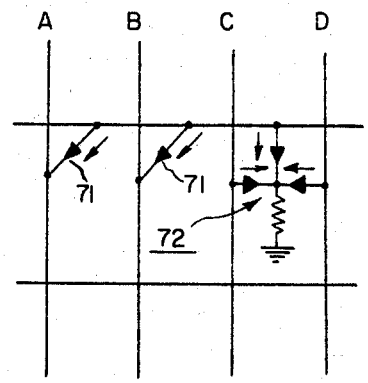

An object of this invention is to provide a sequence controller which is low in first cost, adjustable in programming to accommodate a very great variety of control conditions, and of extremely high reliability. Other objects of this invention include the provision of a sequence controller which eliminates plug-in connections but, at the same time, is arranged so that the circuitry can be modified without difficulty by relatively unskilled personnel to accommodate changes in process control pattern, one which possesses a circuit layout which lends itself to a corresponding graphic depiction of the process itself, and one which is compact in space requirements and rugged enough to withstand successfully adverse plant environmental conditions. The manner in which these and other objects of this invention are attained will become apparent from the detailed description and the following drawings, in which:

FIGS. 1A and 1B, the latter of which is a continuation of the former along the broken line drawn across each, together constitute a schematic logic circuit diagram of a preferred embodiment of sequence controller according to this invention which utilizes a stepping switch as the sequencing agency and in which typical different types of control apparatus are shown in association, FIG. 2 is a schematic logic circuit diagram of another embodiment of sequence controller according to this invention which utilizes flip-flop counters as the sequencing agency, FIG. 3 is a detailed schematic representation of a combination "AND"–"OR" gated circuit which can be incorporated as a modification in the conditional logic matrix of either of the embodiments of FIGS. 1A–1B or 2, and FIG. 4 is a detailed schematic representation of diodes in a conditional logic matrix connected through switches adapted to be operated in an optional selection made via punched cards or similar arrangement.

Generally, the sequence controller of this invention comprises, in combination, a conditional logic matrix providing an ordered array of electrical circuit paths gated so as to correspond with the attainment of preselected conditions in the process to be controlled, a switching device, the outputs of said electrical circuit paths being connected in individual sequence with actuation means for said switching device, a command logic matrix having a configuration constituting an ordered array of electrical circuits connected by said switching device between a power source and means adapted to effect said attainment of said preselected conditions in said process to be controlled, and electrical interlocking means responsive to the attainment of said preselected conditions in said process to be controlled adapted to transmit verifying signals to said conditional logic matrix actuating said switching device so as to establish powered electrical connections in a programmed sequence through preselected individual ones of said ordered array of electrical circuits in said command logic matrix.

Referring to FIGS. 1A and 1B, the conditional logic matrix is indicated generally at 10 and the command logic matrix is indicated generally at 11, the interrelationship therebetween being effected by a switching device indicated generally at 12, which, in this embodiment, is a conventional 2-bank type stepping switch.

For simplicity of representation, each of the horizontal levels of the two logic matrices is reserved to a single control step, and the electrical circuits corresponding to any given individual step are made via contacts 9 and 9' for conditional logic matrix 10 and command logic matrix 11, respectively, by the rigid ganged switch arms 22 and 23 positioned at the same horizontal level, as indicated by the step designations adjacent each of the matrices.

With most processes, it is convenient to effect control on the basis of the simultaneous attainment of a multiplicity of process conditions, which may, typically, be a preselected pressure, temperature, flow of material or other condition which can be made to signal its existence by actuation of a limit switch or in other manner. If each level of conditional matrix 10 is then gated appropriately, control can be effected by a dwell in each successive step of the process until the attainment of all conditions mandatory to passage to the next step in sequence. In FIG. 1A, the vertical conductors of matrix 10 are represented as selectively energized to furnish the process condition attainment verification, so that the connections of diodes 16 and 17, as well as all of their schematically shown counterparts on other step levels, are in the "AND" logic convention (see the description of Decision Circuit Elements, AND gate, pp. 22–23, "Logical Design of Digital Computers" by Montgomery Phister, Jr. (1958), published by John Wiley & Sons, Inc.), with current flow therethrough in the direction of the arrows drawn in adjacent each. This gating is conveniently accomplished by individual semiconductor diodes, although vacuum diodes or transistors can be substituted, as is well-known in the art. For simplicity in the representation, all gating connections below step No. 1, FIG. 1A, are indicated merely by an "X" drawn at the appropriate grid intersection reserved for an individual condition within a pre-evolved plan of process control. The voltage source for signal inputs to the conditional logic matrix is a D.-C. source 18, typically +40 volts, and the interlock between the process and matrix 10 is a multiplicity of field switch contacts denoted generally at 14, individual ones of which are designated (FIG. 1A) PS No. 1, PS No. 2, i.e., pressure switches No. 1 and No. 2, TS No. 1, i.e., temperature switch No. 1, FS No. 1, i.e., flow switch No. 1 and LS No. 1, LS No. 2, i.e., limit switches No. 1 and No. 2, which latter can be reserved for any other control condition, such as liquid level, the achievement of a given analytical quality, or the like. The electrical circuit from each vertical conductor of matrix 10 is completed through individual resistors 19 (typically 1200 ohms each) connected to a source of D.-C. pull-down voltage $E_d$ (typically −100 volts) which functions in conjunction with a source of pull-up voltage $E_v$ hereinafter described to actuate switching device 12. Thus, if the diodes of any given step, such as diodes 16 and 17 of step #1, are not simultaneously back-biased by source 18 as a result of closure of their associated field switch contacts 14 (in this instance LS No. 1 and LS No. 2, respectively) gating current flow from pull-up voltage source $E_v$ through resistors 25 and 19 to $-E_d$ is sufficient to preclude operation of switch 12 as hereinafter described. Accordingly, with the circuit connections shown for matrix 10 of FIG. 1A, step No. 1 is reserved for the closure of both of the limit switches LS No. 1 and LS No. 2 before stepping switch 12 indexes to the next following step, and all succeeding steps are each uniquely reserved for the attainment of a preselected process condition or conditions, or for control intervention in other ways to be described.

The operation of gating for the embodiment of FIGS. 1A and 1B requires that the source of D.-C. pull-up voltage $E_v$ (typically +100 volts) be connected in series with the operating coil 20 of stepping switch 12 through resistor 25 (typically 1800 ohms). Finally, a ground clamp diode 21 is provided in electrical circuit between the switch arm 22 of the first bank of switch 12 and ground. Gating in the circuit described depends upon the achievement of an operating potential at the particular contact 9 with which switch arm 22 is engaged. With the resistors and voltages proportioned as hereinbefore described, the potential at any contact 9 which switch arm 22 engages reverts to ground level as a result of the ground clamp connection 21 until the field contacts 14 are closed for all conditions for which the given step is reserved, e.g., the closure of both of the contacts LS No. 1 and LS No. 2 for step No. 1. However, when these contacts both close, the potential at contact 9 for step No. 1 rises under the influence of pull-up voltage $E_v$ to substantially the level of source 18, as a result of the back-biasing action of source 18 barring further current flow from $E_v$ to $E_d$ via diodes 16 and 17, whereupon a pulse of current passes through stepping switch coil 20, and the stepping switch immediately indexes to step No. 2, moving the second bank switch arm 23 in unison with it by the gang connection 24 indicated in broken line representation in FIGS. 1A and 1B.

The command logic matrix 11 (FIG. 1B) utilizes diodes, such as 31 and 32 of step No. 1, as buffers, i.e., to insure current flow only to the field devices preselected. All diodes in matrix 11 of steps beyond step No. 1 are indicated simply as circles disposed at the appropriate grid locations. Matrix 11 is powered from D.-C. source 30, which may typically be +40 volts, and thus provides a multiplicity of unique electrical circuits through switch arm 23 to various field devices, such as are schematically represented at $R_1$-$R_6$, $R_N$, which can be any of a wide variety of power-actuated devices, such as valve operators, pump motors, and the like, which effect the several process operations. The operation of each of these devices is individually or collectively monitored by a pair of the field switch contacts 14, hereinbefore mentioned in connection with matrix 10, which constitute the interlocking means for the apparatus.

As drawn in FIG. 1B, $R_1$ and $R_2$ are electrical relays which, during step No. 1, close contacts $R_1$ and $R_2$, respectively, and actuate the two solenoid valves 33 and 34. Limit switch switch contacts LS No. 1 and LS No. 2 are represented adjacent the two valve assemblies, these being identical with the field contacts 14 denoted LS No. 1 and LS No. 2, hereinbefore described.

It may be desirable to utilize time control for various steps of the process, and this is readily accomplished by the use of a conventional time pulse generator 35, which routes its pulse output through a three-bit binary counter indicated generally at 36. The outputs of the flip-flops comprising the counter are utilized in exactly the same manner as the signal voltages received via field contacts 14 and, accordingly, are each provided with pull-down resistors 40 corresponding to resistors 19. The two states of the counters are indicated by the digits "0" and "1" drawn within the three flip-flop symbols of 36, and the apparatus furnishes signals to matrix 10 at the completion of time periods the duration of each of which is preselected for the achievement of a particular process step. The time coincidence of counter output voltages delivered to the prearranged diodes, such as those indicated at 41 for step No. 2 and at 42 for step No. 4, co-relate the time allotment for each of these steps with any signals unique to these steps derived via field switch contacts 14 as a result of sensed process operations. Counter 36 is started at the proper point in the process by an electrical signal received from command logic matrix 11 via diodes such as 45 and 46 (FIG. 1B) for steps No. 2 and No. 4, respectively, through electrical conductor 47, whereas the counter is reset to zero via diodes 48 and 49, disposed in the next-succeeding steps, through electrical conductor 50. Time pulse generator 35 is preferably operated continuously, as is the usual practice. "AND" gate 35a interposed between timer 35 and counter 36 having as the second input the start signal of line 47, initiates operation of the counter at the proper instant.

It is sometimes desirable to adjust the set point of a process temperature controller, such as that denoted 51 in FIG. 1B. This is readily accomplished through the intermediary of a conventional digital-to-analog converter 52, which, in combination with temperature controller 51, is made to select a predetermined temperature level responsive to a numerical code set up in matrix 11 by diodes, such as those denoted 53 for step No. 5. Typically, the digital-to-analog converter produces a current in the range of 0–5 ma. which is directly related to the numerical coded input introduced via diodes 53. This current is then applied to the set-point input of the electronic temperature controller 51. Temperature controller 51 is provided with a field contact TS No. 1, identical with TS No. 1 at the top of conditional logic matrix 10, which insures an appropriate time dwell at step No. 5 for adjustment of the temperature to the new level prior to the indexing of switch 12 to step No. 6.

To initiate operation of the sequence controller automatically, there is provided a step No. 0 contact 9 which is connected to the source of D.-C. potential 18 through a push button start switch 54, so that the operator merely has to depress the switch momentarily to index switch arms 22 and 23 to step No. 1. Thereafter, the sequence controller proceeds without further attention through step No. 1 and all of the succeeding steps as soon as all of the operations allocated to each individual step have been completed in turn as assured by the several gatings under interlocking control hereinbefore described. Additional circuitry, not shown, can be readily provided to permit manual superposition of control over that of the controller, should that become necessary, such as an immobilizing switch for the apparatus as a whole, manual powered switches shunting one or a multiplicity of field contacts 14, or other auxliaries.

One installation of sequence controller according to FIGS. 1A and 1B had a total of 100 field inputs introduced through contacts 14, and exercised control to the extent of 100 command outputs. A time counter 36 employed in the controller had a range of 0–1000 secs. obtained by use of ten flip-flops operating in the binary number system. The total of inputs to the digital-to-analog converter 52 and temperature controller 51 was 10 in number, with a temperature control resolution of one part in a thousand.

Referring to FIG. 2, the second embodiment of this invention utilizes essentially the same conditional and command matrix arrangement as the apparatus of FIGS. 1A–1B, but employs additional interconnected matrices, such as sequence matrix 58 and flip-flop set matrix 59 to enable substitution of the flip-flop binary counter 60 as the sequencing agency in place of the stepping switch 12. Thus, in FIG. 2 the D.-C. voltage source 18' for conditional logic matrix 10' can be a +40 volt source identical with 18, provided with a plurality of field switch contacts 14' (only one of which is detailed), accommodating individual verification signal lines $F_1$–$F_5$, $F_n$. Command logic matrix 11' is interconnected step by step with matrix 10' by diodes 61 which, together with all the other diodes in the conditional logic matrix, are connected in the "AND" logic convention as hereinbefore described for the embodiment of FIG. 1A and are all indicated schematically by the letter "X."

All buffer diodes are represented schematically by circles, and these include all those of command logic matrix 11' in circuit with the individual vertical conductors leading to the operated devices $D_1$–$D_4$, $D_n$ in the process under control as well as the stepping diodes 65 of matrix 10' and the special purpose diodes 66 of matrix 59. The power sources for the several matrices of the embodiment of FIG. 2 are conventional and this circuitry is not detailed for simplicity in the showing. Finally, matrix 59 is provided with a number of diodes 67 connected in the "AND" logic convention which permit setting of counter 60, completely independent of conditional logic matrix 10', to a preselected step level as dictated by emergency, or manual override at the will of the operator, the latter requiring an independent power source 68, which may be a +40 volt D.-C. source identical with 18 and 18', and, of course, a manually operated switch 69.

The operation of the controller of FIG. 2 is very similar to that already described for the embodiment of FIGS. 1A–1B. Assuming that the apparatus depicted is at the beginning of step No. 0, when the field inputs corresponding to $F_1$ and $F_2$ both close switch contacts 14', a plus voltage is applied to the two diodes of step No. 0 and, providing that counter 60 is set to its 000 position (indicated adjacent the first horizontal level of sequence matrix 58 for this first level and in vertical column thereunder for all succeeding levels), the appropriate command logic signals will be delivered to devices $D_1$ and $D_2$ via the two left-hand conductors of command logic matrix 11'. The diode 61 of matrix 10' corresponding to step No. 0 will likewise have voltage applied to it and, the multiple "ANDING" of all three diodes at this step being now completed, buffer diode 65 in this step passes a set signal via line 70 to counter 60, advancing it one count to step No. 1, or 001 in the binary code. The completion of the first control operation will be verified by distinctive field signals connected through specific field switch contacts 14' (not detailed) to $F_2$ and $F_3$ of matrix 10' connecting with step No. 1 of the conditional logic matrix 10', whereupon the control cycle will be repeated exactly as hereinbefore described.

It may sometimes occur that an emergency can conceivably arise in a given control step which will necessitate an overriding setting of counter 60 to an appropriate step taking care of the eventuality and, for purposes of explanation, this is assumed to be step No. 0 (or 000 in the binary code). This is accomplished by flip-flop set matrix 59 which is connected directly with two field signal lines $F_4$ and $F_5$ signalling the emergency, e.g., excessive temperature or pressure attainment in the process, or the like, through diodes 67. It is assumed that in this instance the possibility of the emergency arising in confined to step No. 2 although, of course, the response can be made perfectly general, if desired, without limitation to any particular step or steps. Accordingly, step No. 2 is "ANDED" through its own diode 67 with the other diodes 67 on the top level of 59. The multiple "ANDING" of all three of these diodes actuates counter 60 to 000 position via the buffer diodes 66 on the same level and thereupon brings the process to the preselected planned condition to accommodate the emergency.

Another contingency which is provided for is manual override related to step No. 4 of command logic matrix 11'. Thus, the left-hand diode 67 on the second level of matrix 59 has the voltage of source 68 applied to it at will by manual closure of switch 69 and this, coupled with the voltage applied to the diode 67 in circuit with step No. 4, matrix 11', actuates the buffer diodes 66 on the second level of matrix 59 to set counter 60 to a predetermined position which is planned in advance as an accommodation for the manual intervention, in this instance step No. 6 (or binary code 110).

Obviously, provision can be readily made for a great variety of other override controls, depending upon the requirements of the particular process involved; however, the two hereinbefore detailed are typical.

It is occasionally necessary to provide diode connections in the conditional logic matrices 10 and 10' which give an "AND-OR" logic action and this is readily accomplished by the circuit shown in FIG. 3. Here the diodes 71 function as "AND" gates responsive solely to conductors A and B individually, as hereinbefore described for diodes 16 and 17, FIG. 1A, whereas the three-diode configuration represented generally at 72 functions as an "AND-OR" gate, in that it connects either conductor C or conductor D.

Figure 4:
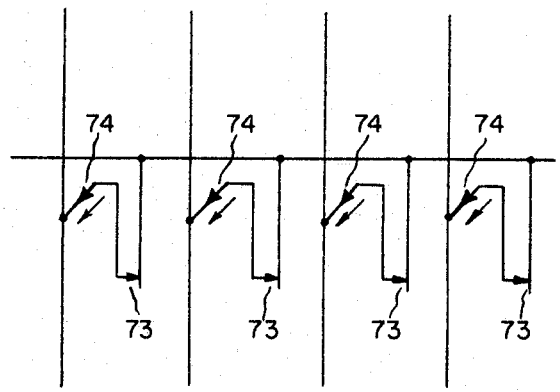

FIG. 4 illustrates a conditional matrix circuit having great versatility in rearrangement of connections, which is achieved by interposing individual punched card-operated switches 73 in series with individual diodes 74. Thus, depending on requirements, preselected intra-matrix connections can be made at will by the punched card, or equivalent, controlled closing or opening of any number of switches 73, thereby inserting or removing their associated diodes into or out of any given matrix circuit configuration. The modification of FIG. 4 can be particularly desirable where product recipes vary one from another and where certain processing steps must be altered, or even entirely eliminated as an accommodation.

From the foregoing it will be apparent that the apparatus of this invention can be modified in numerous respects without departure from its essential spirit and it is intended to be limited only by the following claims.

I claim:

1. An electrical sequence controller comprising, in combination:
   a conditional logic matrix providing an ordered array of electrical circuit paths gated so as to correspond with the attainment of preselected conditions in a process to be controlled,
   a switching device and actuation means for said switching device,
   means connecting the outputs of said conditional matrix electrical circuit paths in individual sequence with said actuation means,
   a power source and means operative to effect said attainment of said preselected conditions in said process to be controlled,
   a command logic matrix having an ordered array of electrical circuits connected by said switching device between said power source and said preselected condition attainment means, and
   condition-detecting means responsive to the attainment of said preselected conditions in said process to be controlled to allow transmission of electrical verifying signals to said conditional logic matrix for actuation of said switching device, said switching device establishing powered electrical connections in a programmed sequence through preselected individual ones of said ordered array of electrical circuits in said command logic matrix.

2. An electrical sequence controller according to claim 1 provided with means for overriding said conditional logic matrix in said actuating of said switching device so as to establish said powered electrical connections in said programmed sequence through preselected individual ones of said ordered array of electrical circuits in said command logic matrix independently of said conditional logic matrix.

3. An electrical sequence controller according to claim 1 wherein said switching device is a stepping switch.

4. An electrical sequence controller according to claim 1 wherein said switching device is a binary counter provided with gating means effecting a preselected switching action.

References Cited by the Examiner
UNITED STATES PATENTS

| | | | |
|---|---|---|---|
| 2,898,483 | 8/1959 | Muller | 307—115 |
| 2,964,657 | 12/1960 | Page | 340—166 |
| 2,969,533 | 1/1961 | Shanahan | 340—166 |
| 2,992,410 | 7/1961 | Groth et al. | 340—166 |
| 3,036,229 | 5/1962 | Kemp et al. | 307—115 |
| 3,058,094 | 10/1962 | Springies et al. | 340—166 |

NEIL C. READ, *Primary Examiner.*

LLOYD McCOLLUM, *Examiner.*

A. SCHWARTZ, A. KASPER, *Assistant Examiners.*